United States Patent Office 3,531,239
Patented Sept. 29, 1970

3,531,239
METHOD AND COMPOSITION FOR RETARDING WATER EVAPORATION
John J. Rowlette, 2644 S. Mayflower Ave., Arcadia, Calif. 91006
No Drawing. Filed Oct. 2, 1968, Ser. No. 764,632
Int. Cl. B01j 1/18
U.S. Cl. 21—60.5                              9 Claims

ABSTRACT OF THE DISCLOSURE

A method and composition for forming thin films of evaporation-reducing agents upon a water surface by adding to the water a solid admixture which includes a saturated aliphatic interface-active hydrocarbon intermixed with a water-soluble material, said water-soluble material being capable of generating a gas when contacted by water.

BACKGROUND OF THE INVENTION

Evaporation of water to the atmosphere poses serious problems both as to large bodies of water used for irrigation, industrial, or drinking purposes, and as to small bodies of water such as swimming pools. In the case of large bodies of water, evaporation causes substantial losses which can result in economic loss and actual water shortages. In the case of swimming pools, evaporation results in heat losses which can average as much as 1,000,000 B.t.u. per day in a typical swimming pool.

It has long been recognized that certain chemical compounds are capable of forming a monomolecular layer on a surface of water and can thereby act to reduce substantially water evaporation. In effect, such materials form a chemical barrier on the water surface. Long-chain saturated aliphatic interface-active hydrocarbons such as alcohols, carboxylic acids, and esters have been known as compounds capable of forming the desired monomolecular layer.

Despite the long-standing knowledge of utilizable evaporation-retarding compounds, full advantage of this capability has not been taken because of heretofore unsolved problems in dispersing such compounds on water surfaces. Because of bacterial attack, wind, and eventual evaporation of the compounds themselves, the evaporation-retarding compounds must be periodically reapplied to a water surface to provide consistent effectiveness.

On-site grinding and spreading of the finely-ground compound over the surface of a large body of water results in significant material losses and, at the least, requires considerable investment in grinding and spreading equipment. Use of volatile solvents as carrier vehicles introduces problems of limited solubility of evaporation-retarding compounds in such solvents and the consequent need for handling large quantities of liquids to add the amount of compound required to form a surface layer. Other methods, such as deposition of the compound in large blocks on the water surface or the use of emulsions, present problems which seriously affect the convenience and effectiveness of application.

There has therefore existed a need for a method and composition through which an evaporation-retarding layer of a compound could, at a reasonable cost, be established and re-established as required on a water surface.

SUMMARY OF THE INVENTION

The present invention is a method for forming a thin film of an evaporation-reducing agent upon a water surface, and a composition which, when added to water, results in such a film. To the water is added a solid admixture which includes a saturated aliphatic interface-active hydrocarbon intermixed with a water-soluble material.

Preferably, the solid admixture is compacted and includes as active ingredients a saturated aliphatic interface-active hydrocarbon, a water-soluble salt selected from the group consisting of water-soluble carbonates and bicarbonates, and an acid. The admixture also includes a water-soluble filler. The active ingredients comprise from 10% to 90% of the bulk volume of the compacted admixture.

To form the admixture, the aliphatic hydrocarbon is pre-ground, preferably to a particle size of about 100 microns, admixed with the water-soluble salt, acid, and filler, and is then compacted. For use in smaller bodies of water such as swimming pools, the admixture is preferably compacted into tablets having a thickness of four millimeters or less and a diameter of about one-half inch. For use in larger bodies of water, the admixture is compacted into large slugs and then fragmented to form granules having a diameter of four to five millimeters. As a processing aid, a mold-release agent can be added to the admixture.

Upon addition of the compacted admixture to water, the water-soluble filler is dissolved and carbon dioxide is produced by the reaction between the salt and acid, which are sometimes referred to herein as the gas-forming ingredients. Even though the bulk density of the admixture may be greater than the density of water, the rapid liberation of carbon dioxide generally causes the compacted admixture to float in the water. Even if the compacted admixture is below the water surface, the carbon dioxide bubbles carry the saturated hydrocarbon, sometimes referred to herein as the film-forming compound, to the water surface where it is dispersed to form an evaporation-retarding film on the surface.

The compacted admixture of the present invention can be applied with facility to either large or small bodies of water. Because the pre-ground film-forming compound is dispersed in a water-soluble solid matrix, the compound does not agglomerate so that the shelf life of the admixture is essentially unlimited. Since a very high proportion of film-forming compound, as high as 45% by weight, can be incorporated in the admixture, the total weight of material handled is low compared to the areal film-forming capability. There is thereby provided an efficacious means of retarding surface evaporation.

DESCRIPTION OF THE PREFERRED EMBODIMENTS

Long-chain saturated aliphatic alcohols, carboxylic acids, and esters may be used as film-forming compounds in the compacted admixture. These must be water-insoluble and non-toxic. Suitable hydrocarbons are those having a chain length from $C_{14}$ to $C_{20}$ although saturated hydrocarbons having a chain length from $C_{16}$ to $C_{18}$ are generally preferred. Among the alcohols which may be used are octadecanol, hexadecanol, nonadecanol, and pentadecanol; among the esters are vinyl stearate, isopropyl stearate, and tristearin, an ester of glycerol and stearic acid. Combinations of hydrocarbons, as, for example, a mixture of hexadecanol and octadecanol, can also be used.

As gas-forming compounds, nontoxic water-soluble acids and salts which are solids at atmospheric temperatures are used. Examples of suitable acids are citric, tartaric, and succinic. Sodium bisulfate may also be used. The carbonates and bicarbonates of potassium, sodium, lithium, and ammonia are examples of suitable salts. The selected acid and salt are mixed in stoichiometric amounts in the compacted admixture, any excess of either acting merely as a water-soluble filler. To this end, because of their lower densities, the admixture is formulated so that an excess, if any, is in the acidic gas-forming ingredient. It is preferred that the total of the gas-forming ingredients in the required stoichiometric amounts be in the range of 50% to 75% by volume of the admixture excluding the film-forming compounds.

The fillers in the admixture must be readily soluble in water and nontoxic. Consistent with these requirements, the fillers are selected to provide a maximum reduction in the bulk density of the compacted admixture. Various sugars including sucrose, salt, and carboxymethylcellulose are examples of inert fillers that may be satisfactorily used.

Examples of materials which may be added to the admixture as mold-release agents are magnesium stearate and boric acid.

Ingredients selected from among the compounds described above are admixed and compacted. A suitable degree of hardness to which the admixture is compacted can be determined by relatively simple tests. For example, a tablet which does not shatter upon being dropped approximately six feet to a concrete base has an acceptable hardness. In general, the ingredients are selected and compacted so that, consistent with the requirement that the compacted admixture have a hardness sufficient to withstand normal handling, the bulk density of the compacted admixture does not exceed 1.4.

It has also been found that the flotation characteristic of the compacted admixture is improved by providing a depression or concavity in both sides of the tablet. The concavity assists in trapping carbon dioxide bubbles.

In order to disclose the nature of the present invention still more clearly, the following illustrative examples are given. It is to be understood that the invention is not to be limited to the specific details set forth in these examples except to the extent that such limitations are specified in the appended claims.

EXAMPLE I

A mixture of hexadecanol and octadecanol was pre-ground and mixed with gas-forming ingredients, inert filler, and a mold-release agent to provide the following formulation by weight percent:

| | Percent |
|---|---|
| Hexadecanol | 15 |
| Octadecanol | 23 |
| Tartaric acid | 20 |
| Sodium bicarbonate | 21 |
| Sucrose | 18 |
| Magnesium stearate | 3 |

The admixture was compacted into tablets having a bulk density of about 1.4. The tablets floated upon addition to water and a thin film of hexadecanol and octadecanol was dispersed over the water surface.

EXAMPLE II

In the formulation of Example I, ammonium bicarbonate was substituted for sodium bicarbonate.

EXAMPLE III

In the formulation of Example I, succinic acid was substituted for tartaric acid.

EXAMPLE IV

Octadecanol was pre-ground and mixed with gas-forming ingredients and inert filler to provide the following formulation by weight percent:

| | Percent |
|---|---|
| Octadecanol | 36 |
| Citric acid (anhydrous) | 20 |
| Sodium bicarbonate | 24 |
| Sodium chloride | 20 |

The admixture was compacted into tablet form and added to water. The tablets floated and a thin film of octadecanol was dispersed over the water surface.

It will be apparent to those skilled in this art that modifications and variations of the invention as set forth above may be made within the scope and spirit of the invention.

1. A method for forming thin films of evaporation-reducing agents upon a water surface comprising adding to the water a compacted solid admixture which consists essentially of a saturated aliphatic interface-active hydrocarbon intermixed with a water-soluble material, said water-soluble material being capable of generating a gas when contacted by water.

2. A method for forming thin films of evaporation-reducing agents upon a water surface comprising adding to the water a compacted solid admixture consisting essentially of a water-soluble filler and as active ingredients a saturated aliphatic interface-active hydrocarbon, a salt selected from the group consisting of water-soluble carbonates and bicarbonates, and an acid.

3. Method in accordance with claim 2 wherein the compacted admixture is in the form of a tablet.

4. Method in accordance with claim 3 wherein the tablet has a thickness of equal to or less than four millimeters.

5. A composition for forming thin films of evaporation-reducing agents upon a water surface consisting essentially of a compacted solid admixture of a saturated aliphatic interface-active hydrocarbon intermixed with a water-soluble material, said water-soluble material being capable of generating a gas when contacted by water.

6. A composition for forming thin films of evaporation-reducing agents upon a liquid surface comprising a compacted solid admixture consisting essentially of a water-soluble filler and as active ingredients a saturated aliphatic interface-active hydrocarbon, a salt selected from the group consisting of water-soluble carbonates and bicarbonates, and an acid.

7. Composition in accordance with claim 6 wherein the active ingredients comprise from 10% to 90% of the bulk volume of the compacted admixture.

8. Composition in accordance with claim 6 wherein the hydrocarbon has a chain length in the range from $C_{14}$ to $C_{20}$.

9. Composition in accordance with claim 6 wherein the hydrocarbon is octadecanol, the salt is sodium bicarbonate, and the acid is tartaric acid.

References Cited

UNITED STATES PATENTS

| | | | |
|---|---|---|---|
| 1,985,491 | 12/1934 | Fisher | 21—60.5 |
| 2,797,139 | 6/1957 | Veatch | 21—60.5 |
| 3,146,059 | 8/1964 | Suzuki et al. | 21—60.5 |
| 3,154,505 | 10/1964 | Watanabe | 21—60.5 XR |
| 3,273,957 | 9/1966 | Beredjick | 21—60.5 |
| 3,391,987 | 7/1968 | Myers | 21—60.5 |

JOSEPH SCOVRONEK, Primary Examiner

B. S. RICHMAN, Assistant Examiner

U.S. Cl. X.R.

252—381, 383